US005772390A

United States Patent [19]
Walker

[11] Patent Number: 5,772,390
[45] Date of Patent: Jun. 30, 1998

[54] COAL LOADING SYSTEM AND METHOD

[76] Inventor: Harold A. Walker, 3406 Stoneridge Dr., Johnson City, Tenn. 37604

[21] Appl. No.: 870,862

[22] Filed: Jun. 6, 1997

[51] Int. Cl.$^6$ .................................................. B65G 67/22
[52] U.S. Cl. .......................... 414/786; 414/329; 414/397; 414/21; 177/1; 141/83; 222/64
[58] Field of Search ..................................... 414/397, 323, 414/572, 586, 160, 185, 199, 299, 293, 21, 786, 328, 329; 177/1; 141/83, 192; 222/56, 64

[56] References Cited

U.S. PATENT DOCUMENTS

| | | | |
|---|---|---|---|
| 4,460,308 | 7/1984 | Moonetal ............................. | 414/329 X |
| 4,629,392 | 12/1986 | Campbell et al. ..................... | 414/329 X |
| 4,904,154 | 2/1990 | Campbell et al. ..................... | 414/397 X |

FOREIGN PATENT DOCUMENTS

| | | | |
|---|---|---|---|
| 36032 | 2/1984 | Japan ...................................... | 414/397 |
| 725985 | 4/1980 | U.S.S.R. ................................. | 414/328 |
| 765163 | 9/1980 | U.S.S.R. ................................. | 414/329 |
| 880929 | 11/1981 | U.S.S.R. ................................. | 414/21 |
| 1664685 | 7/1991 | U.S.S.R. ................................. | 414/328 |
| 1064434 | 4/1967 | United Kingdom .................... | 414/397 |

Primary Examiner—Frank E. Werner

[57] ABSTRACT

A method for loading a moving railroad car from front to back with a target weight of particulate material from a loading unit having a silo and first and second weigh bin, which bin means have a combined material weight capacity of less than the target weight, the method comprising the steps of:

(a) making a first charge of material into the first bin;
(b) discharging a first quantity of material from the first bin into a forward portion of the car;
(c) making a second charge of material into the first bin;
(d) discharging a second quantity of material from the first bin into a rearward portion of the car, wherein the weights of the first and second quantities are determined and, as a combined weight, is less than the target weight;
(e) making a charge of material into the second bin;
(f) discharging from the second bin into the car a topping quantity of material equal in weight, to within about 0.5%, to the target weight less the combined weight, to thereby attain, within very close limits, the target weight of material in the car; and
(g) wherein either or both of the charging step of (e) and the discharging step of (f) may be initiated at any convenient time during the car loading operation.

17 Claims, 8 Drawing Sheets

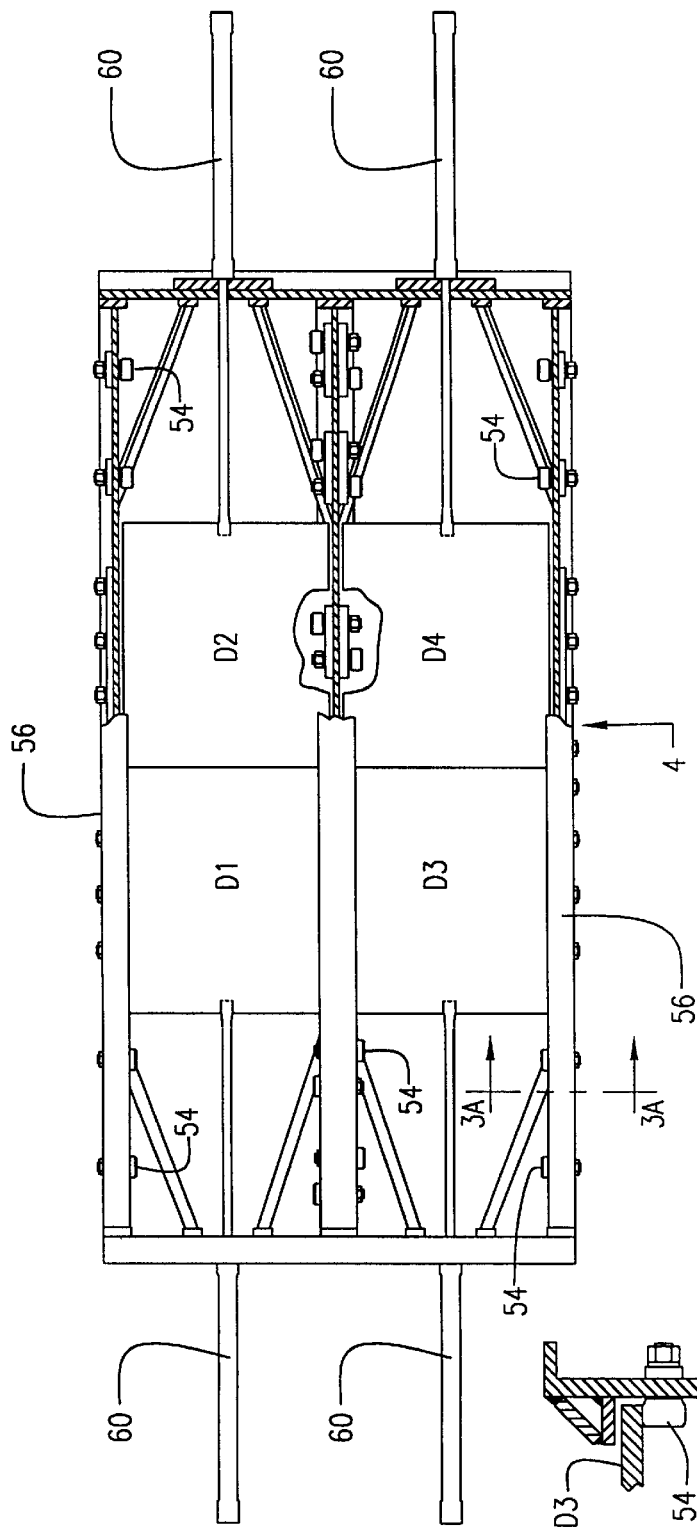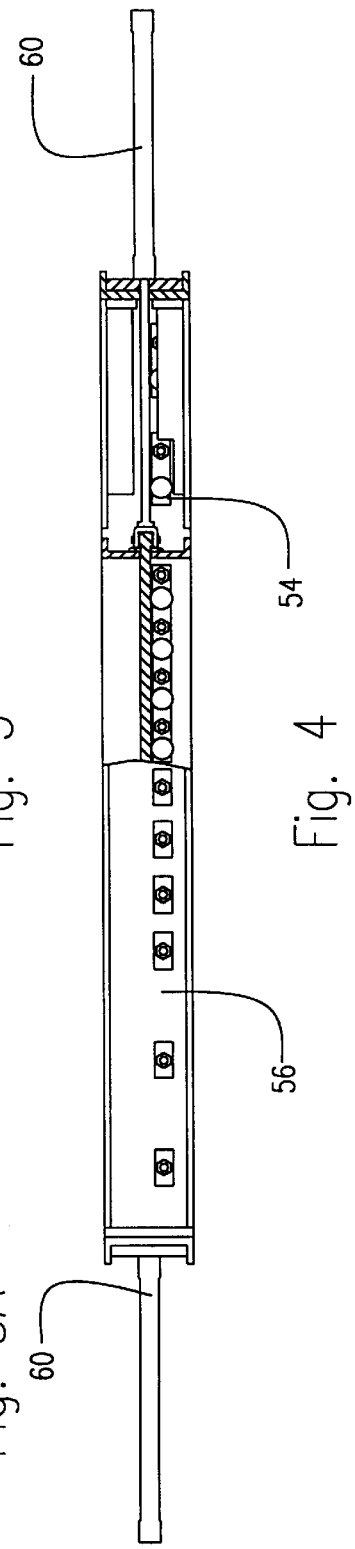
Fig. 3
Fig. 3A
Fig. 4

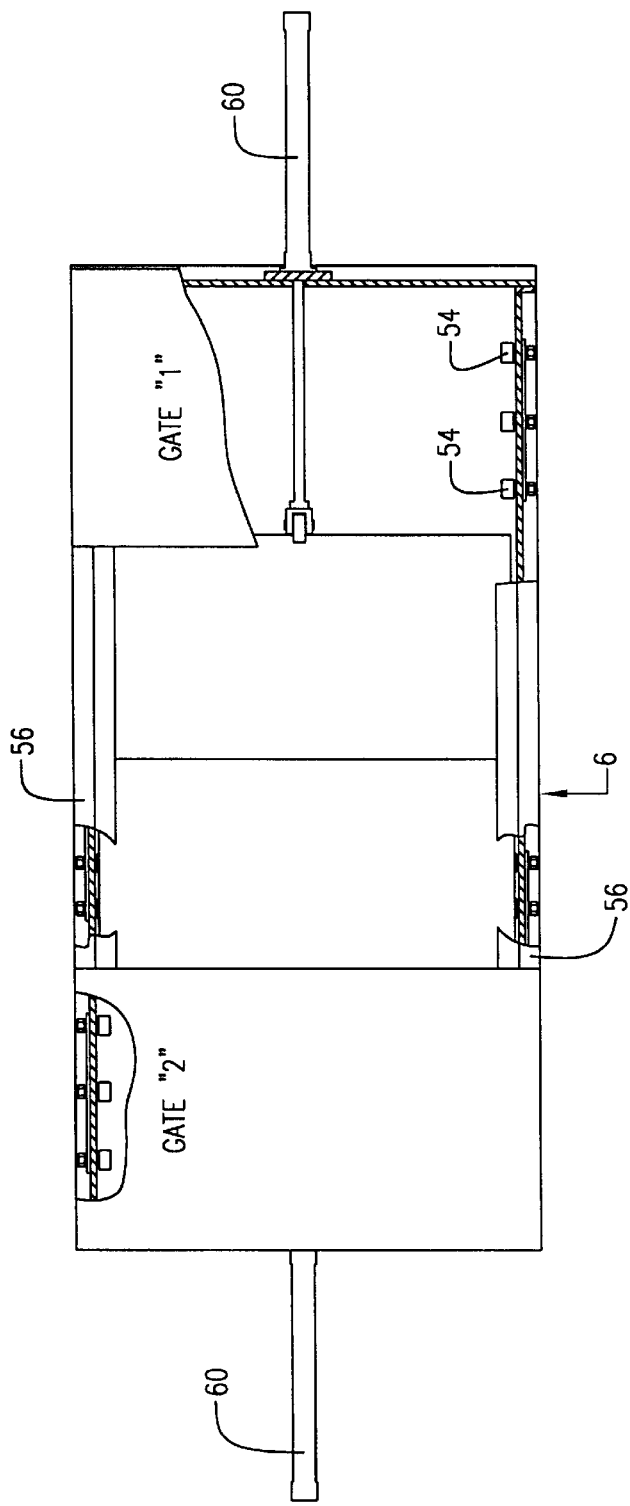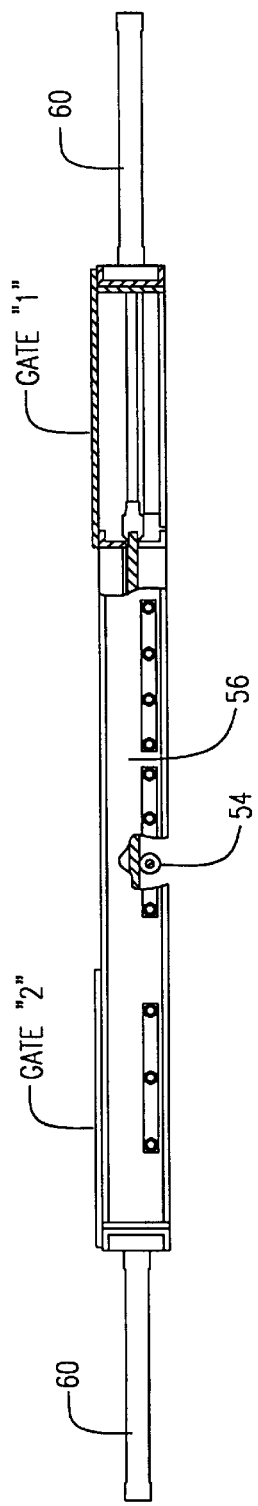
Fig. 5
Fig. 6

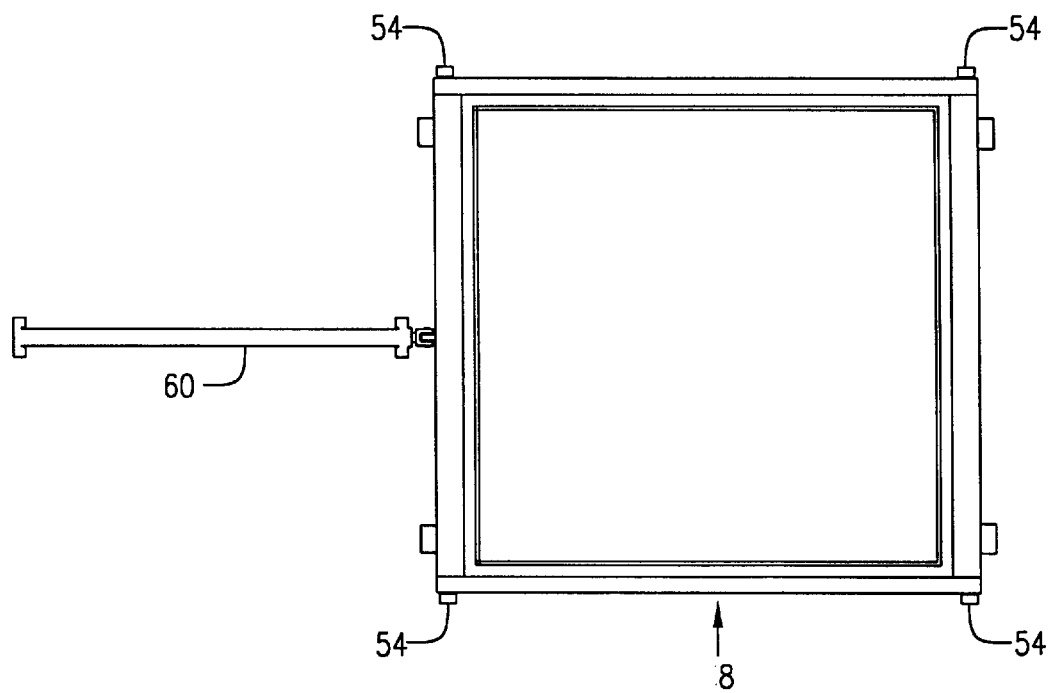
Fig. 7
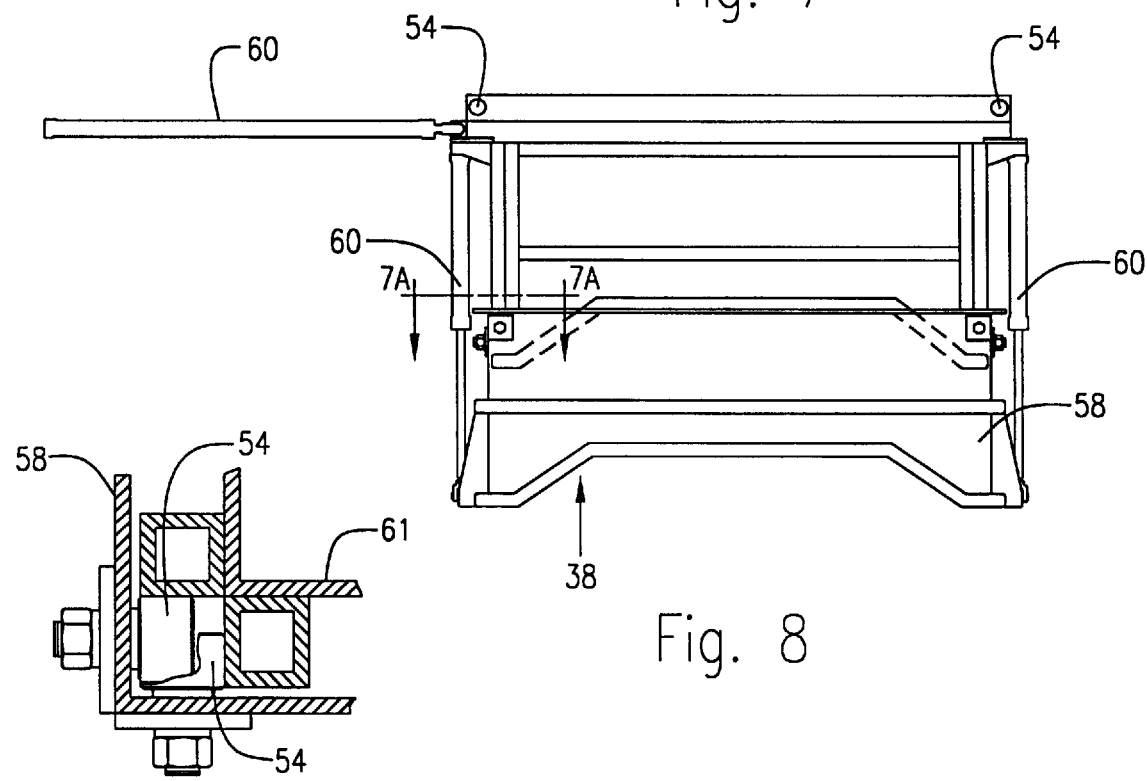
Fig. 8
Fig. 7A

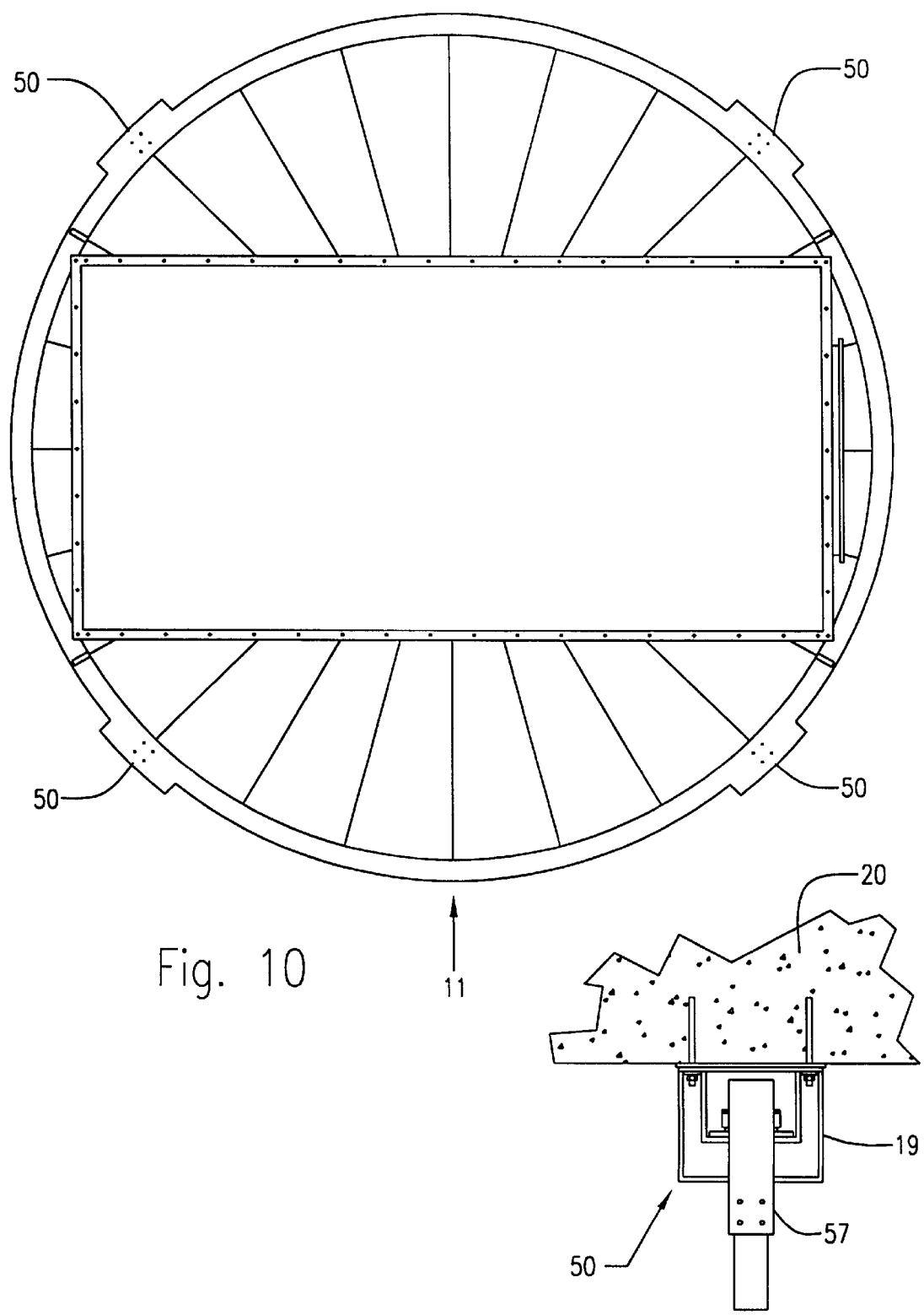

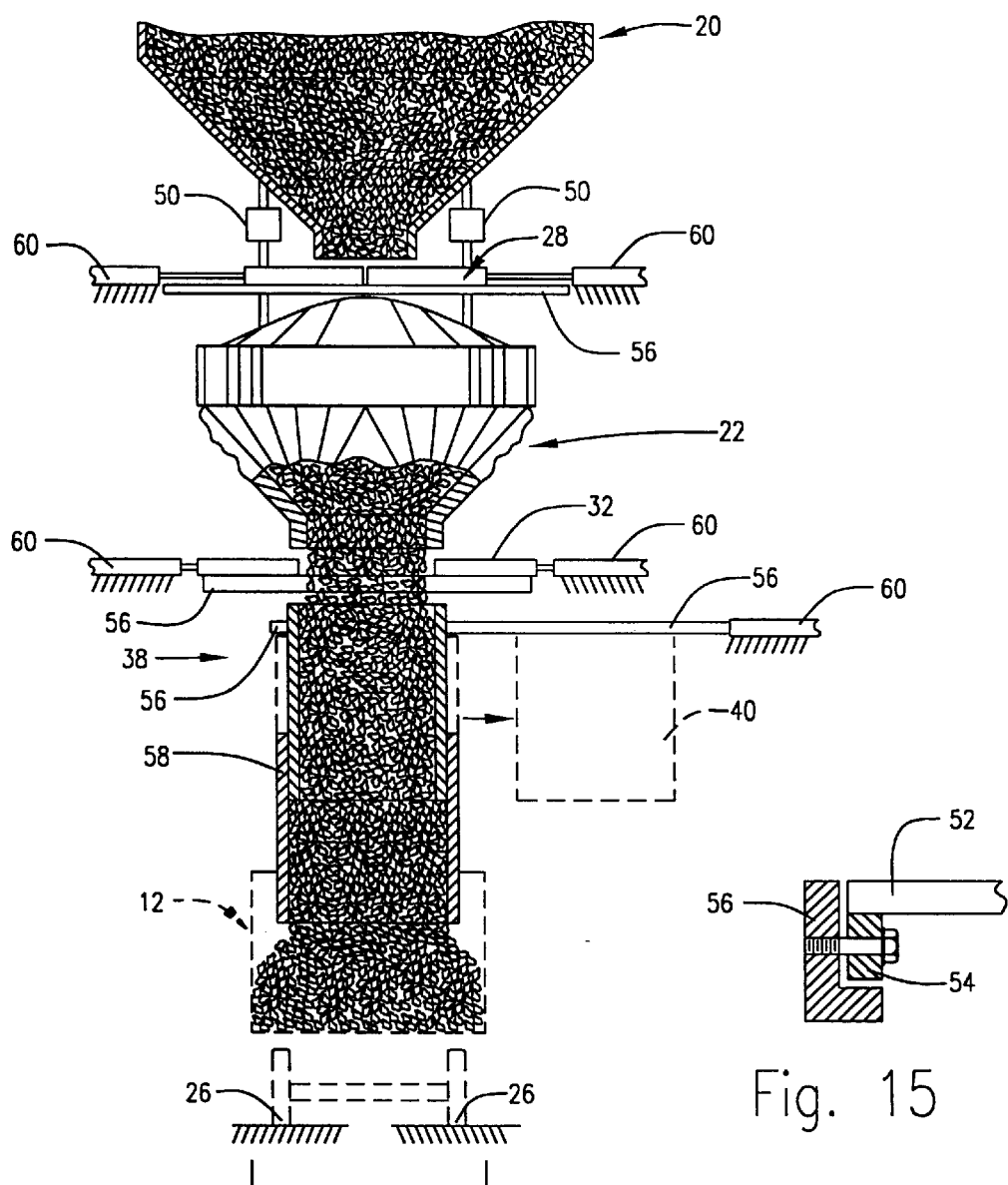
Fig. 13
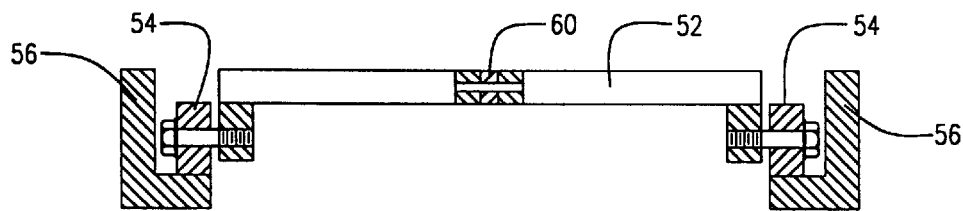
Fig. 14
Fig. 15

COAL LOADING SYSTEM AND METHOD

BACKGROUND OF THE INVENTION

1. Field of the Invention

This invention concerns coal loading or batching apparatus and method for loading moving railroad cars with precise weights of coal, e.g., maximum car weight capacity, from large silos substantially positioned above railroad tracks, and particularly concerns such apparatus and method in the forms required for adapting existing coal silos and car loading sites to accommodate larger capacity cars and their maximum load capacities while providing markedly improved loading weight monitoring and regulation.

In order to achieve the high capacity car loading rates required by certain mining operations in the limited loading space allowed, while maintaining the loading accuracy required, it was necessary to design a unique system and method of operation, and to optimize every part of that system. For example, space limitations under certain silos of long standing allow the use of only two weigh bins, each having a capacity, e.g., of about 45 tons. Therefore, the only way to load a 100+ton rail car with two such 45 ton bins is to dump, reload and dump again at least one of the bins.

Such multiple charging and discharging operations, in order to be commercially efficient, must be done at a rate which can accommodate a railcar moving, e.g., about one mile/hr. Due to the necessity for such double operations for each car, adequate time may not be available for some loading sites and their available equipment for precisely preloading both bins such that a target weight, of e.g., 120 tons can be accurately achieved. Consequently, the present unique structures and operations which have been designed for two bins under each silo, employ bins of similar construction but which have different but complimentary functions and are differently operated, whereby a high target weight loading accuracy is achieved due to the fact that one of the bins is adapted to make full bin capacity discharges, while the other bin is adapted to make precise, topping weight discharges.

2. Discussion of Prior Art

Certain types of apparatus and methods presently in use for loading large railroad cars of, e.g., 100+ton capacity, typically involve dumping large loads of approximate desired weights into moving cars from silos, weigh bins, conveyors, or other loading equipment. The use of such apparatus and methods however, often leads to significant weight inaccuracies in filling the cars, e.g., by running of the cars past the loading apparatus' discharge point with consequent spillage of the coal over the rear of the cars, or by spillage over the silos of the car as a natural result of the high discharging rates required, or by inadequate material weighing facilities on the apparatus which allows loading the cars to weights which are not within prescribed limits set e.g., by Federal Regulations, or by the coal mining site, or by the MAP railroad operators.

Such apparatus and methods are exemplified in U.S. Pat. Nos. 4,460,308; 4,629,392; 4,284,380; 4,904,154; and 4,659,274, the disclosures of which are hereby incorporated herein in their entirety by reference. None of these disclosures however, speak to the problem of how to efficiently and precision load large, e.g., 120 ton capacity cars which must pass beneath huge preexisting coal silos which provide only limited space thereunder for car loading equipment employing weigh bins which lie intermediate the silo and the car.

OBJECT OF THE INVENTION

Principal objects therefore, of the present invention are to provide the loading means and method for its operation whereby maximum size railroad coal cars can be filled to a desired target weight within close weight tolerances, e.g., less than about 0.5% deviation from the target weight, wherein overrunning of the coal discharge into the cars and other spillage are essentially avoided; and to provide such loading means in a structural form which is readily adapted to compliment existing undersized or highly restricted, e.g., low headroom silo loading sites.

SUMMARY OF THE INVENTION

The above and further objects and advantages hereinafter becoming evident have been attained in accordance with the present invention through the discovery of unique structural means and its method of use, which provides for precision loading a predetermined target weight of bulk particulate material into each moving car of a series of moving, connected, open top railroad cars progressively from front to rear of each car within a loading area from a loading unit having silo means and associated first and second weigh bin means supported above the railroad tracks, wherein each said bin means is independently supported under said silo means in a loading area and spaced apart from the other along said tracks a distance which is considerably less than the length of said car, wherein space limitations under said silo means require that the total material weight capacity of both said bin means combined be less than said target weight, wherein said silo means has first and second bin charging gate means, wherein each said bin means has a car loading discharge gate means, and wherein said cars are moving in a direction which places it first under said first bin means and then under said second bin means, wherein during each pass of a car thru said loading area, said first bin means is charged twice with material and discharged twice into said car, and said second bin means is charged once with a topping charge of material and discharged once into said car, and wherein the weight of topping material discharged from said second bin means is equal to-within close tolerances-the difference between said target weight and the combined weights of the two discharges from said first bin means.

In certain preferred embodiments:
(a) the charging of said material to said second bin means is controlled by progressive closing of said second bin charging gate means in response to a progressive series of charging gate closing signals generated from a progressive series of net weight determinations of the first and second quantities of material discharged from said first bin means;
(b) the charging of said topping material to said second bin means is initiated prior to the completion of the second discharge from said second bin means; and
(c) the weight of all of said charges to said bins are predetermined and are attained by careful operation of the bin charging gate means during the bin charging operations.

The invention will be understood further from the drawings herein of certain preferred embodiments and the description thereof, wherein:

FIG. 3 is a plan view of a weigh bin discharge gate means in closed position and provided with four independently operable hydraulically or air actuated gates for making a precision discharge;

FIG. 4 is a side elevation view taken in the direction of line 4 in FIG. 3;

FIG. 5 is a top plan view of a large charging gate means with two gates shown in open position and actuable by hydraulic cylinders;

FIG. 6 is a side elevation view taken in the direction of line 6 in FIG. 5;

FIG. 7 is a top plan view of a vertically adjustable loadout chute having laterally operable power means for quickly moving the chute out of the way of a moving car;

FIG. 8 is a side elevation view taken in the direction of line 8 in FIG. 7;

FIG. 9 is a partially cross-sectioned view of a weigh bin weighing loadcell and its mounting to a silo;

FIG. 10 is a top plan view of a weigh bin;

FIG. 13 is a schematic, partially cross-sectional of the general arrangement of the present loading system as viewed from the rear of a car with the first bin means in its first discharge mode;

FIG. 14 is a cross-sectional view of a useful construction for the mounting of the charging or discharge gates, or the loading chute retractor of the present invention; and FIG. 15 is a partial view as in FIG. 14 of a variation of the mounting construction.

DETAILED DESCRIPTION OF THE DRAWINGS

Figure 1:
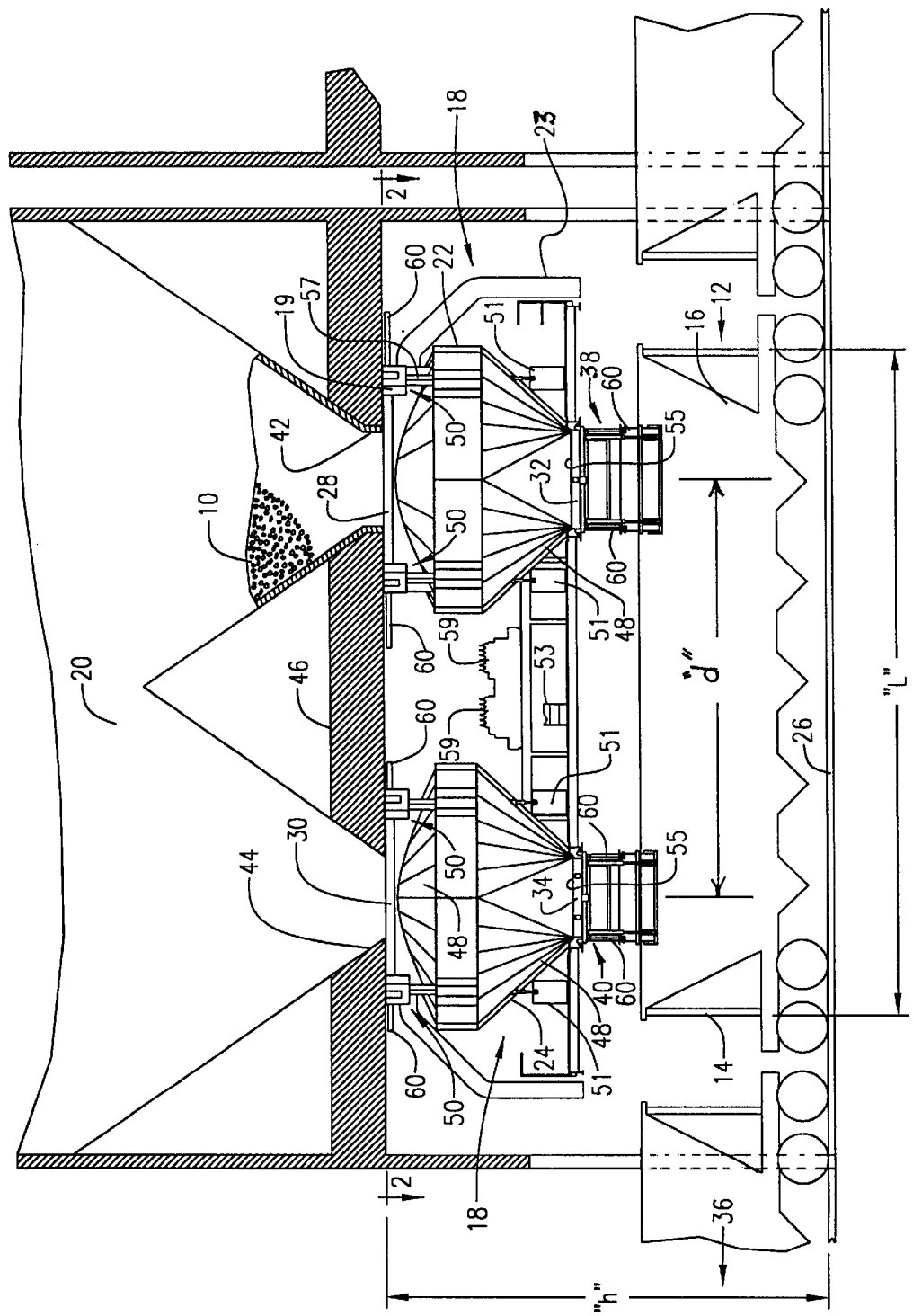
FIG. 1 is a side elevational view of a typical coal silo and railroad track and car arrangement wherein the car is shown in dotted outline and two weigh bins are employed in accordance with the present invention and wherein the height of the silo discharge ports are at a fixed limited distance above the tracks.
Figure 2:
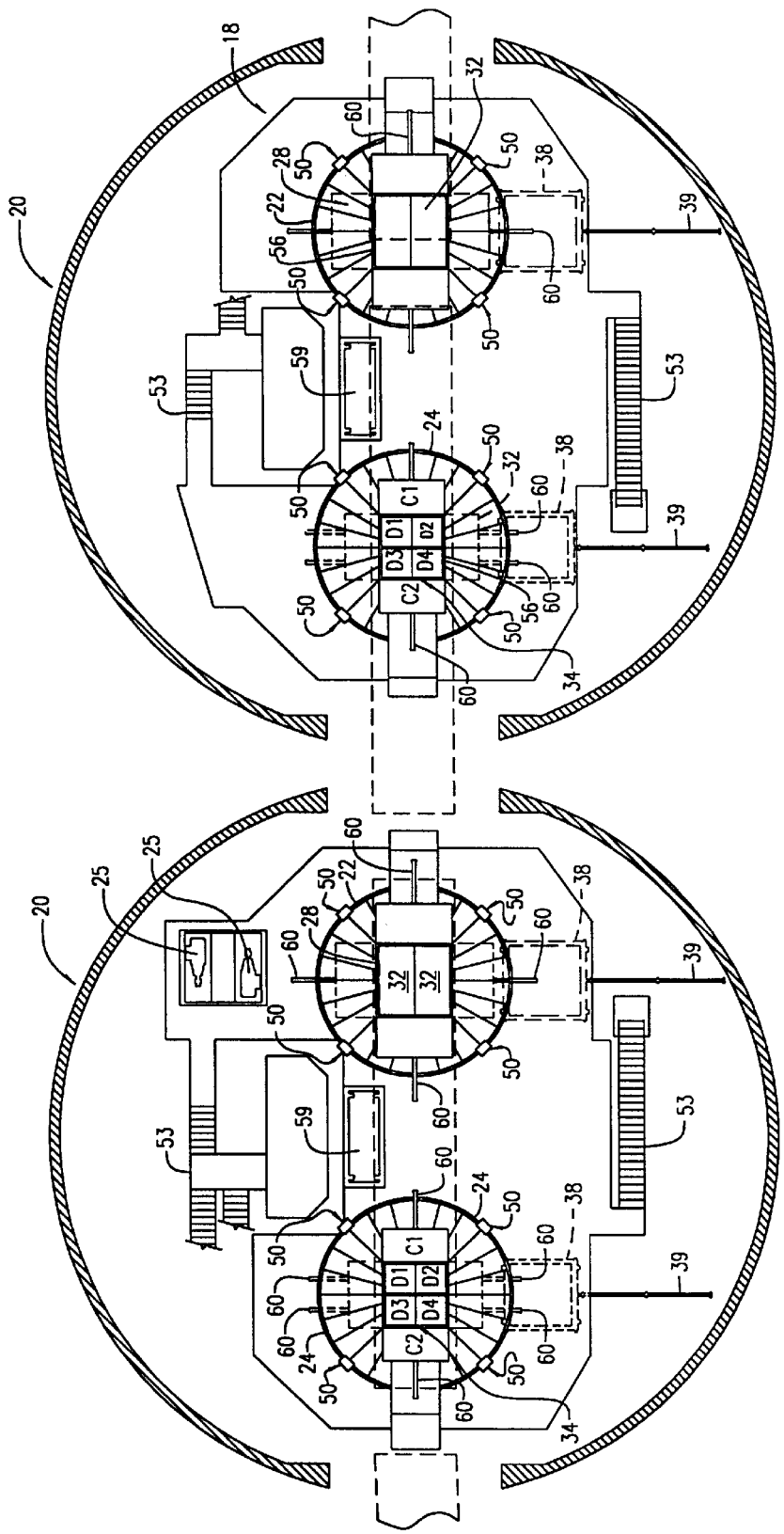
FIG. 2 is a plan view taken along line 2—2 of FIG. 1 in the direction of the arrows and showing the present for multiple silos in accordance with the present invention.
Figure 11:
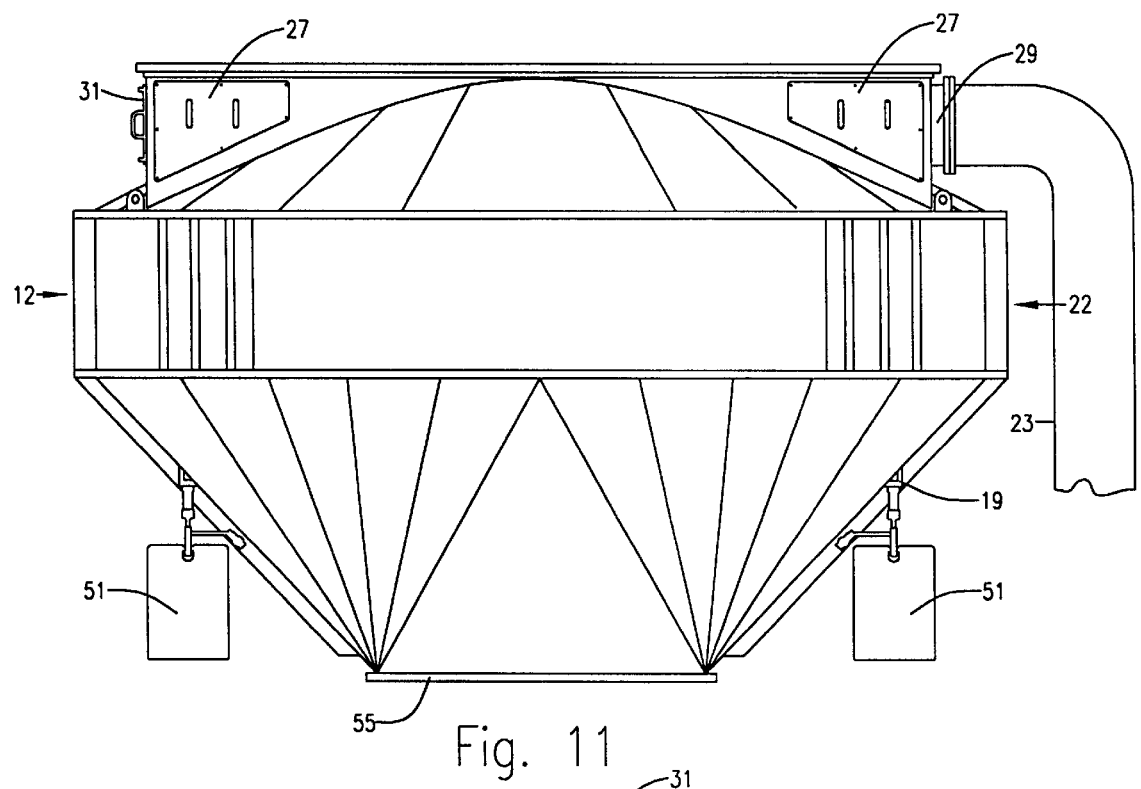
FIG. 11 is a side elevation view of the bin of FIG. 10 taken in the direction of line 11 in FIG. 10.
Figure 12:
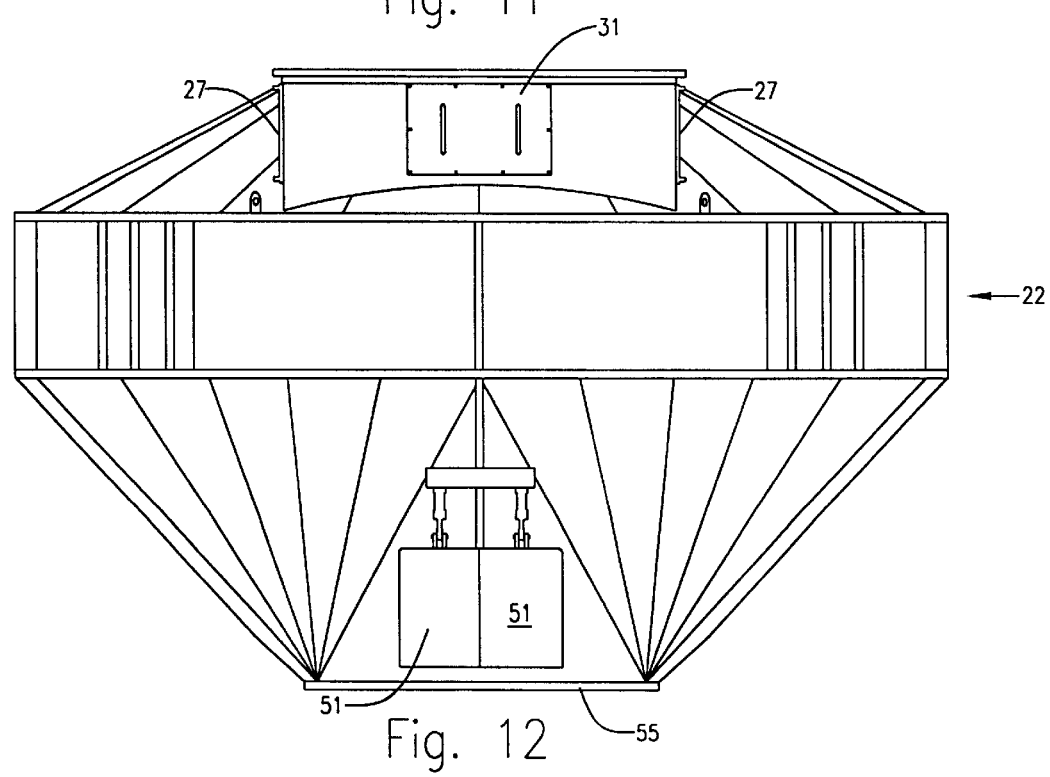
FIG. 12 is a side elevation view of the bin of FIG. 11 taken in the direction of line 12 in FIG. 11.

Referring to the drawings which are exemplary of material loading structures by which the present invention can be carried out, and with particular reference to the claims herein, the present loading method markedly increases the loading rates for precision loading a predetermined target weight of bulk particulate material 10 into a moving car 12 of a series of moving, connected, open top railroad cars progressively from front 14 to rear 16 thereof from a material loading unit generally designated 18 having silo means 20 and associated first 22 and second 24 weigh bin means supported above the railroad tracks 26, each said bin means being independently supported under said silo means and spaced apart from the other along said tracks a distance "d" which is considerably less than the length "L" of said car, wherein space limitations such as height "h" under said silo means 20 require that the combined weight capacities of both said bin means be less than said target weight, wherein said silo means 20 has first 28 and second 30 bin charging gate means, wherein said bin means 22, 24 have first and second car loading discharge gate means 32, 34 respectively and wherein said car is moving in the direction of arrow 36 which places it first under said first bin means 22 and then under said second bin means 24, all within a general loading area approximated as "L×L$_1$" as shown.

In carrying out the present process wherein both bins are fairly accurately batched or loaded without careful batching accuracy, the first bin 22 will take and discharge two batches into each rail car. It is important that the batches be made and dumped as fast as possible and weighed to a static accuracy of at least about 0.1%. I have therefore elected to use a 7'-0 square first weigh bin charging gate 28 and discharge gate 32, and also with a 7'-0 square telescopic loading chute 38. I have also decided to use only one set point. The initial set point for the charging gate will be about 10 tons prior to target weight and the set point for closing the discharge gate will be about 100 lbs. above zero.

The second bin 24, wherein it is to be precisely loaded, is equipped with a 5'-0 square double blade charging gate 30 and a 6'-0 square double blade discharge gate 34 and telescopic loading chute 40 of the same dimensions. The 6'-0 square discharge chute is preferred to allow coal to be heaped into the car. By loading as much as possible from the first bin, the required charging and discharging times of the second bin are reduced and two set points can be used for the second bin. At the first set point, half of the charging gate will close, and at the second set point the other half will close. This will allow an average overall batching accuracy for both bins combined of, e.g., about 0.25%, with a maximum batching error of about 0.5% under normal circumstances.

Batching accuracy, typically will be affected by the variability of the coal moisture, density, and size consist. The size consist may change for silos designed for funnel flow, which change can cause segregation of the material according to size. The finer material will be in the center of the silo and be reclaimed first. The coarse material will be around the silo perimeter and be reclaimed last. Flow rates should increase toward the end of the train. It is preferred to incorporate an electrical circuit to correct the second set point of the second bin automatically if the overall batching accuracy is not within 0.25%. For example, if the target accuracy is 500 lbs. and the batch is 800 lbs. under the target, the computer will automatically delay the second set point 400 lbs. for the next batch. As long as the batching accuracy is within prescribed limits, this circuit will not cut in.

In carrying out a preferred embodiment of the present process, the batching accuracy, i.e., the actual weights of material charged to the first bin will have no effect on the total batching accuracy as long as the net weights of material discharged from the first bin are accurately determined. The total weight of material loaded into a car by that bin will be subtracted from the target weight. The balance will be batched into the second bin in a highly controlled manner. For example, if the target weight is 220,000 lbs. and the two combined batches of the first bin are set for 170,000 lbs., but actually batch and discharge 165,000 lbs., the second bin will batch 55,000 lbs. under carefully regulated conditions. Therefore, no effort need be made to make accurate predetermined batch charge weights to the first bin. When charging and discharging, e.g., 45 tons of coal, about 2000 ft$^3$ of air will be displaced from and drawn into the weigh bin in about four to five seconds. This will cause an air flow of 24,000 to 30,000 SCFM for this short four to five second interval. In order to deal with this dust laden air, it is preferred to install a bag house suitable for reverse flow under each silo and connect the two weigh bins to it. The filtered air will be discharged under the silos.

In general, the present loading method is carried out employing a silo 20 such as the circular ones shown, but which can be of any size and configuration, and having discharge ports 42 and 44 for bins 22 and 24 respectively, said silo typically being very large, e.g., sixty feet or so in diameter and two hundred feet or more high. The said discharge ports are usually circular but may be constructed of rectangular or other desired configuration. Their flow areas however, should be adequate to allow the bins to be completely filled in, e.g., about 3–6 seconds. The silo is supported about the tracks by heavy support beams 46 such as steel I beams or reinforced, prestressed concrete beams, or the like.

The bins may be fabricated from welded sections such as the wedge shaped sections 48 and both bins may have substantially the structure and same configuration.

Each bin is essentially free-floating in that it is hung from a stationary support by strain or compression type weighing means 50, one embodiment of which is shown in FIG. 9. Such means includes the known and readily available load cell devices including shear, beam, compression or tension, or the like weighing devices which allow a finite, but sometimes nearly imperceptible degree of movement of the bin in a generally vertical direction, either up when being emptied or down when being filled. This finite movement is sensed, measured, and converted to weight data by such devices which can then send the data to an electronic control center for conversion, e.g., to bin charging or discharge gate actuation signals.

Weight measuring devices, their operation and their electronic accounterments, useful in carrying out the present invention are typified by those shown in the Revere Corporation of America, Wallingford, Conn., 1983© brochure, 35 pages, and by pages 33 and 88 etc., of the Rice Lake Weighing Systems, 1996 brochure, 30534 pages. Any number of these devices may be used in concert and symmetrically positioned on each bin such as not to interfere with movable elements of the system such as the bin charging gates and their actuator mechanisms.

The useful structures and configurations of the charging and discharging gate means and their actuator mechanisms can be substantially the same. For example, each gate means can comprise a single slidable gate, or two oppositely slidable gates, or four slidable gates. The greater number of slidable gates generally allows for a more easily regulatable and precision flow rate of material into or out of the bin.

For example, where it is desirable to carefully regulate the flow of material into the topping bin 24, a four gate means such as shown in FIGS. 3 and 4 may be employed for the charging. By means of progressively closing these four gates as the bin is becoming filled, a precise material topping weight in the bin may be realized. It is noted that such progressive gate closings is preferably controlled according to quasi continuous net topping weight determinations of the material being dumped into the bin with respect to the aforesaid target weight and the two discharge net weights from the first bin 22.

Similarly, where it is desirable to carefully regulate the flow of material from said second bin 24 into a car such that a precise topping weight in the car can be realized, even though said bin was bulk charged without concern for the actual weight of material being loaded into it, the four gate construction can be used as the bin discharge gate means and the net weight of material going into the car continually determined to attain discharge of the proper topping weight.

The gates are essentially heavy steel plates 52 preferably supported on rollers 54 which may be rotatably mounted either on the plate itself as shown in FIG. 14 or on the side or guide rail means 56. Likewise, the loading chute 40 is preferably rollably supported in the same manner, and as shown in FIG. 13 can be retracted laterally out of the way of locomotive or other obstruction after the lower, upwardly retractable portion 58 of the chute is retracted from its down or loading position shown.

The gates and loading chute portion 58 are all actuated, i.e., moved by the action of an operator manipulating hand operated valving 59 to operate hydraulic or pneumatic cylinders 60, or preferably by computer means in accordance with such electronic signals as generated for proper periods of charging and discharging with respect to material weights, target weight, position of the cars relative to the bins, and the like.

The invention has been described in detail with particular reference to preferred embodiments thereof, but it will be understood that variations and modifications will be effected with the spirit and the scope of the invention.

I claim:

1. The method for loading a moving railroad car from front to back with a target weight of particulate material from a loading unit having a silo means and first and second weigh bin means, which bin means have a combined material weight capacity of less than said target weight, said method comprising the steps of:

(a) making a first charge of material into said first bin means;

(b) discharging a first quantity of material from said first bin means into a forward portion of said car;

(c) making a second charge of material into said first bin means;

(d) discharging a second quantity of material from said first bin means into a rearward portion of said car, wherein the weights of said first and second quantities are determined and, as a combined weight, is less than said target weight;

(e) making a charge of material into said second bin means;

(f) discharging from said second bin means into said car a topping quantity of material equal in weight, to within about 0.5%, to said target weight less said combined weight, to thereby attain, within very close limits, the target weight of material in said car; and (g) wherein either or both of the charging step of (e) and the discharging step of (f) may be initiated at any convenient time during the car loading operation.

2. The method of claim 1 wherein the weights of all of said quantities of material are determined prior to their being discharged from their respective bin means.

3. The method of claim 2 wherein the total weight of material charged in steps (a) and (c) is said combined weight, and wherein the weight of said topping quantity is determined by subtracting said combined weight from said target weight.

4. The method of claim 3 wherein the chargings of said first, second and topping quantities are carefully controlled by careful regulation of the opening and closing of the charging gate means to their respective bin means.

5. The method of claim 4 wherein the weights of said first, second and topping quantities are all predetermined prior to their being charged to their respective bin means.

6. The method of claim 1 wherein the weights of said first and second quantities of material are each determined subsequent to their discharge from said first bin means.

7. The method of claim 6 wherein said discharging operation of step (f) is regulated to continue to provide said topping quantity of material throughout the discharge operation of step (d) and during the subsequent determination of said combined weight, whereby said required weight of topping quantity can be accurately calculated and the discharging operation of step (f) continued until said target weight is achieved.

8. The method of claim 1 wherein the discharging operation of step (f) is initiated prior to the completion of the discharging operation of step (d).

9. The method of claim 1 wherein the discharging operation of step (f) is initiated prior to the start of the discharging operation of step (d) and is regulated to continue to discharge said topping quantity of material throughout the discharge operation of step (d) and during the subsequent determination of said combined weight, whereby the required weight of said topping quantity can be accurately calculated and the discharging operation of step (f) continued until said target weight is achieved.

10. The method of claim 1 wherein each charge of material to said first bin means comprises substantially a full capacity load for said first bin means.

11. The method of claim 10 wherein the discharge of said second quantity of material is regulated to completely empty said first bin means in time to prevent an overrun of the discharge beyond the rear of said car.

12. The method of claim 1 wherein the weight data for said first, second and topping quantities are electronically obtained and are fed to control means which regulate the opening and closing of discharge gate means provided on said second bin means for adjusting the flow of materials from said second bin means whereby an accurate discharge weight of said topping quantity is achieved.

13. The method of claim 1 wherein the weight data for said first, second and topping quantities are electronically obtained and are fed to control means which regulate the opening and closing of charging gate means provided for said second bin means whereby an accurate weight of said topping quantity is achieved.

14. A method expressed in the form of a charging cycle for achieving markedly increased loading rates for precision loading a predetermined target weight of bulk particulate material into a moving car of a series of moving, connected, open top railroad cars progressively from front to rear thereof from a loading unit having silo means and associated first and second weigh bin means supported above the railroad tracks, each said bin means being independently supported under said silo means and spaced apart from the other along said tracks a distance which is considerably less than the length of said car, wherein space limitations under said silo means require that the combined capacities by weight of both bin means be less than said target weight, wherein said silo means has first and second bin charging gate means, wherein each bin means has a car loading discharge gate means, and wherein said car is moving in a direction which places it first under said first bin means and then under said second bin means, said charging cycle comprising the steps of:

(a) making a first charge of material into said first bin means from said silo means;

(b) obtaining the gross weight of said first bin means;

(c) discharging a first quantity of material from said first bin means into a forward section of said car;

(d) obtaining the net weight of said first quantity;

(e) charge of material into said first bin means from said silo means;

(f) obtaining the gross weight of said first bin means;

(g) discharging a second quantity of material from said first bin means into a section of said car rearwardly of said forward section;

(h) obtaining the net weight of said second quantity;

(i) prior to complete discharge of said second quantity into said car, beginning discharging a topping quantity of predetermined weight of material from said second bin means into said car, said predetermined weight being calculated by subtracting the combined first and second net weights from said target weight; and wherein (j) said discharging of said topping quantity is performed in a highly controlled manner by adjustment of the position of the discharge gate means as a function of the rate of flow of said topping quantity into said car.

15. The method of claim 14 wherein said topping quantity is charged to said second bin means from said silo means by progressive closing of said second bin charging gate means in response to a progressive series of charging gate closing signals generated from a progressive series of net weight determinations of said first and second quantities of material discharged from said first bin means, said weight determinations being made during said discharge steps of (c) and (g).

16. The method of claim 14 wherein said first and second quantities discharged in steps (c) and (g) constitutes the full loads charged to said first bin means in steps (a) and (e).

17. The method of claim 16 wherein the charging of said topping quantity to said second bin means is initiated prior to the completion of the discharge of step (g).

* * * * *